March 29, 1932.  A. McD. DUCKHAM  1,851,819
DUST SEPARATOR
Filed Feb. 3, 1928  2 Sheets-Sheet 1

Inventor
Arthur McDougall Duckham
By James L. Norris
Attorney.

March 29, 1932.  A. McD. DUCKHAM  1,851,819
DUST SEPARATOR
Filed Feb. 3, 1928    2 Sheets-Sheet 2
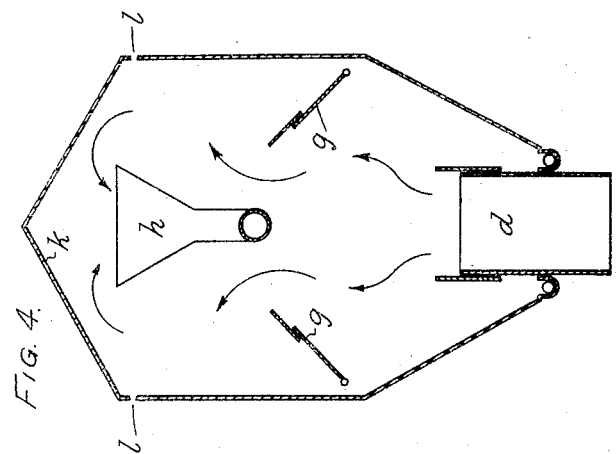
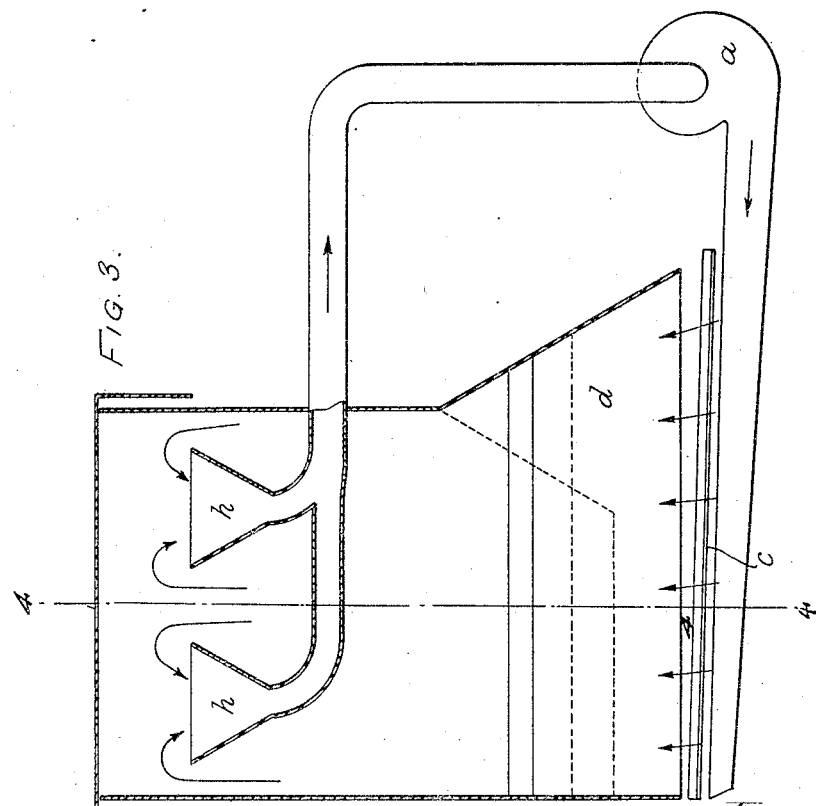

Patented Mar. 29, 1932

1,851,819

UNITED STATES PATENT OFFICE

ARTHUR McDOUGALL DUCKHAM, OF LONDON, ENGLAND

DUST SEPARATOR

Application filed February 3, 1928, Serial No. 251,661, and in Great Britain July 8, 1927.

This invention relates to improvements in the separation or grading of solid materials by the action of an air blast. In some apparatus for this purpose it is the intention that the lighter constituents of the material to be separated or graded shall be borne on the blast and float above the heavier constituents while the support on which the mixture rests is subjected to a reciprocating motion whereby the heavy constituents are moved in a longitudinal direction. In order to avoid pollution of the atmosphere by the lightest constituents of the mixture, which are carried away by the air blast, it is common practice to provide large dust catching chambers above the separating device.

The invention improves such dust catching chambers with a view to ensuring a better deposition of dust therein, so that the air which is returned to the fan to avoid pollution of the atmosphere shall enter the fan as free as may be from suspended matter, thus prolonging the life of the fan.

The chamber is constructed in such a manner that the air which has passed the grading device and has become laden with fine material, flows into the chamber with considerable velocity, which is then rapidly diminished, whereafter the air is caused to travel in the chamber, past the dust pockets, in a stream line flow, that is to say without any sudden change of direction, until its speed is again increased and subsequently diminished. Such alternate variation of speed with maintenance of stream line flow may be repeated several times, although one repetition generally suffices.

The intake of the fan is connected with the upper part of the chamber and in leaving the latter the air reverses its direction.

Owing to this construction the air travels in the chamber with minimum formation of vortex so that there is little tendency for settled dust to be picked up or for suspended dust to remain in suspension.

In the accompanying drawings:

Fig. 3 is a view similar to Fig. 1, of another form, and

Fig. 4 is a section on line 4—4 of Fig. 3.

Figure 2:
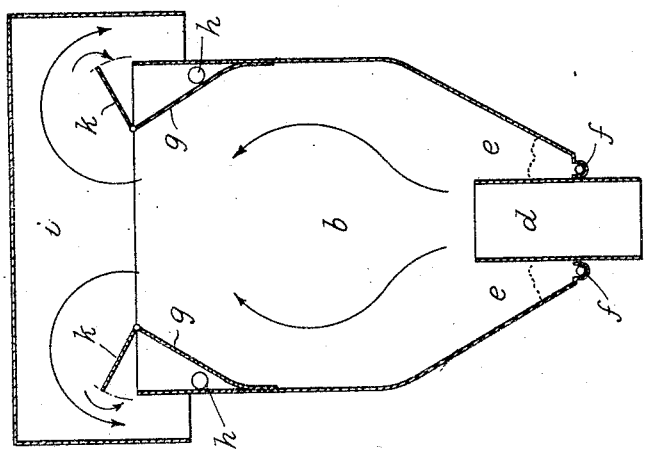
Fig. 2 is a section on line 2—2 of Fig. 1.
Figure 1:
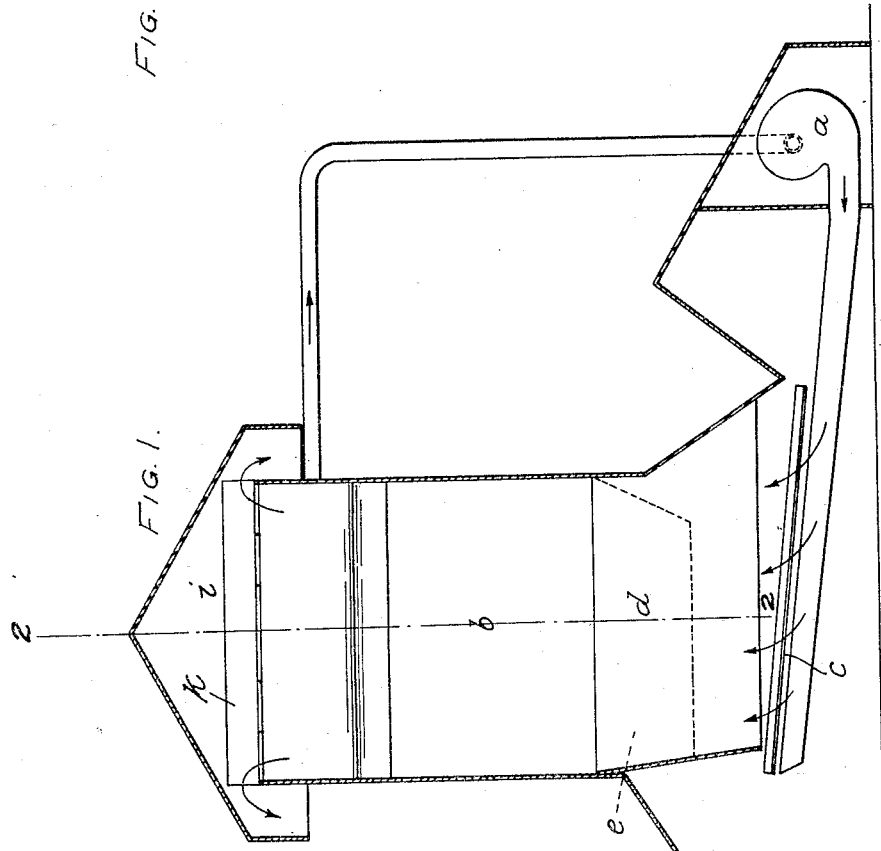
Fig. 1 is a diagrammatic view of one form of dust-catching chamber made according to and embodying the present invention.

Referring to Figs. 1 and 2, the fan $a$ discharges air through the pneumatic separating device $c$ at the bottom of the chamber $b$. The device $c$ may be of any kind but is here represented as of the kind comprising reciprocating screening table along which the coarse material travels owing to the reciprocating movement, while the fine material is taken up by the air. The passage $d$ into the chamber is comparatively narrow and dust pockets $e$ are formed on each side of it; from these pockets the dust is removed by screw conveyors $f$. The main body of the chamber is of cross section considerably wider than that of the passage $d$, but is contracted at its upper part by baffle plate $g$. These may be hinged to the sides of the chamber so as to be of adjustable inclination. Off-takes $h$ leading to the intake of the fan are situated between these baffles and the sides of the chamber. On leaving the open top of the chamber the air expands again into the cover $i$ which may be open at the bottom to avoid serious variation of pressure in the chamber. To avoid as far as possible deposition of dust in the suction pockets formed by plates $g$, hinged flaps $k$ capable of being fixed at any suitable angle are provided. The air is rapidly expanded as it passes from passage $d$ into the chamber and is gradually compressed as it leaves the chamber until it expands again in the cover, where it reverses its direcéon of flow in order to return to the fan.

In Figs. 3 and 4 the construction is generally similar to that shown in Figs. 1 and 2, but the off-takes $h$ to the fan are along the middle line of the chamber. The baffles $g$ are hinged on longitudinal bars spaced a short distance from the sides of the chamber to permit passage of dust down the sides, and are made in parts adapted to slide on each other so that the extent to which the baffle projects into the chamber may be adjusted. So also the slides of the passage $d$ are made in parts adapted to slide on each other so that the path of travel of the air before it is expanded may be varied in length. The cover $k$ is not normally open to the air, but slots $l$ are provided which can be more or less closed by adjustable slides.

Having thus described the nature of my said invention and the best means I know of carrying the same into practical effect, I claim:—

1. A dust catching chamber for pneumatic separation apparatus, including a chamber having a passage through which air enters the chamber, which passage is of considerably smaller cross section than that of the chamber and has walls extending into the chamber, baffles extending from the sides of the chamber towards the middle thereof at a level above the outlet of said passage and terminating short of the planes in which the walls of the passage would lie if produced, off-takes from the chamber beyond the said baffles, and a cover for said chamber forming with said baffles a second chamber in which the air expands after it has passed the said baffles.

2. A dust catching chamber for pneumatic separation apparatus, including a chamber having a passage through which air enters the chamber, which passage is of considerably smaller cross section than that of the chamber and has walls extending into the chamber, baffles extending from the sides of the chamber towards the middle thereof at a level above the outlet of the said passage and terminating short of the planes in which the walls of the passage would lie if produced, offtakes from the chamber beyond the said baffles, said offtakes being disposed within the chamber and along the middle line of the chamber, and a cover for the chamber forming with the said baffles a second chamber in which the air expands after it has passed the said baffles.

In testimony whereof I have signed my name to this specification.

ARTHUR MCDOUGALL DUCKHAM.